(12) United States Patent
Xing et al.

(10) Patent No.: US 12,174,851 B1
(45) Date of Patent: Dec. 24, 2024

(54) CORRECTING ERRORS OF A RUNNING EXTRACT, TRANSFORM, LOAD (ETL) PROCESS

(71) Applicant: INTERNATIONAL BUSINESS MACHINES CORPORATION, Armonk, NY (US)

(72) Inventors: Chengxuan Xing, Winchester (GB); Doina Liliana Klinger, Winchester (GB); Alexander Robert Wood, Romsey (GB); Thomas Soal, Hook (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/538,778

(22) Filed: Dec. 13, 2023

(51) Int. Cl.
*G06F 16/20* (2019.01)
*G06F 16/25* (2019.01)

(52) U.S. Cl.
CPC .................................. *G06F 16/254* (2019.01)

(58) Field of Classification Search
CPC ...................................................... G06F 16/254
See application file for complete search history.

(56) References Cited

U.S. PATENT DOCUMENTS

| | | | |
|---|---|---|---|
| 9,449,060 B2 | 9/2016 | Dhayapule et al. | |
| 10,635,656 B1* | 4/2020 | Clark | G06F 11/1446 |
| 10,831,774 B2 | 11/2020 | Reeve et al. | |
| 11,269,913 B1* | 3/2022 | Dervay | G06F 9/547 |
| 11,954,090 B1* | 4/2024 | Mandala | G06F 16/254 |
| 2012/0284223 A1* | 11/2012 | Belyy | G06F 16/254 707/601 |
| 2012/0324387 A1* | 12/2012 | Rausch | G06F 16/254 715/771 |
| 2015/0046389 A1* | 2/2015 | Dhayapule | G06F 16/245 707/602 |
| 2019/0138387 A1 | 5/2019 | Nautiyal et al. | |
| 2022/0358101 A1 | 11/2022 | Medisetti et al. | |
| 2022/0358136 A1 | 11/2022 | Medisetti et al. | |
| 2022/0374442 A1* | 11/2022 | Kaspa | G06N 5/04 |

FOREIGN PATENT DOCUMENTS

WO    2020139074    7/2020

OTHER PUBLICATIONS

Anonymous, "ETL (Extract, Transform, Load)", https://www.ibm.com/topics/etl, downloaded Nov. 14, 2023, 10 pages.

* cited by examiner

*Primary Examiner* — Mahesh H Dwivedi
(74) *Attorney, Agent, or Firm* — Jared Chaney; Andrew D. Wright; Calderon Safran & Wright P.C.

(57) ABSTRACT

A method, system, and computer program product are configured to: receive, from a user device of a user, input indicating that a first extract, transform, and load (ETL) flow is incorrect and that a second ETL flow is correct; in response to receiving the input, determine whether a change made by the first ETL flow is reversible; in response to determining the change made by the first ETL flow is reversible, generate a corrective ETL flow that is configured to reverse the change made by the first ETL flow; and in response to determining the change made by the first ETL flow is not reversible, notify a user that the change made by the first ETL flow is not reversible, and inform the user which records have been changed such that they can do a manual correction.

20 Claims, 4 Drawing Sheets

CORRECTING ERRORS OF A RUNNING EXTRACT, TRANSFORM, LOAD (ETL) PROCESS

BACKGROUND

Aspects of the present invention relate generally to data integration and, more particularly, to extract, transform, and load (ETL) processes.

An ETL process is a data integration process that may be used to combine data from multiple data sources into a single, consistent data store that is loaded into a data warehouse or other target system. ETL is often used by an organization to: extract data from legacy systems; cleanse the data to improve data quality and establish consistency; and load data into a target database.

SUMMARY

In a first aspect of the invention, there is a computer-implemented method including: receiving, by a processor set and from a user device of a user, input indicating that a first extract, transform, and load (ETL) flow is incorrect and that a second ETL flow is correct; in response to receiving the input, determining, by the processor set, whether a change made by the first ETL flow is reversible; in response to determining the change made by the first ETL flow is reversible, generating, by the processor set, a corrective ETL flow that is configured to reverse the change made by the first ETL flow; and in response to determining the change made by the first ETL flow is not reversible, notifying, by the processor set, a user that the change made by the first ETL flow is not reversible, and informing the user which records have been changed such that they can do a manual correction.

In another aspect of the invention, there is a computer program product including one or more computer readable storage media having program instructions collectively stored on the one or more computer readable storage media. The program instructions are executable to: receive, from a user device of a user, input indicating that a first extract, transform, and load (ETL) flow is incorrect and that a second ETL flow is correct; in response to receiving the input, determine whether a change made by the first ETL flow is reversible; in response to determining the change made by the first ETL flow is reversible, generate a corrective ETL flow that is configured to reverse the change made by the first ETL flow; and in response to determining the change made by the first ETL flow is not reversible, notify a user that the change made by the first ETL flow is not reversible, and inform the user which records have been changed such that they can do a manual correction.

In another aspect of the invention, there is a system including a processor set, one or more computer readable storage media, and program instructions collectively stored on the one or more computer readable storage media. The program instructions are executable to: receive, from a user device of a user, input indicating that a first extract, transform, and load (ETL) flow is incorrect and that a second ETL flow is correct; in response to receiving the input, determine whether a change made by the first ETL flow is reversible; in response to determining the change made by the first ETL flow is reversible, generate a corrective ETL flow that is configured to reverse the change made by the first ETL flow; and in response to determining the change made by the first ETL flow is not reversible, notify a user that the change made by the first ETL flow is not reversible, and inform the user which records have been changed such that they can do a manual correction.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
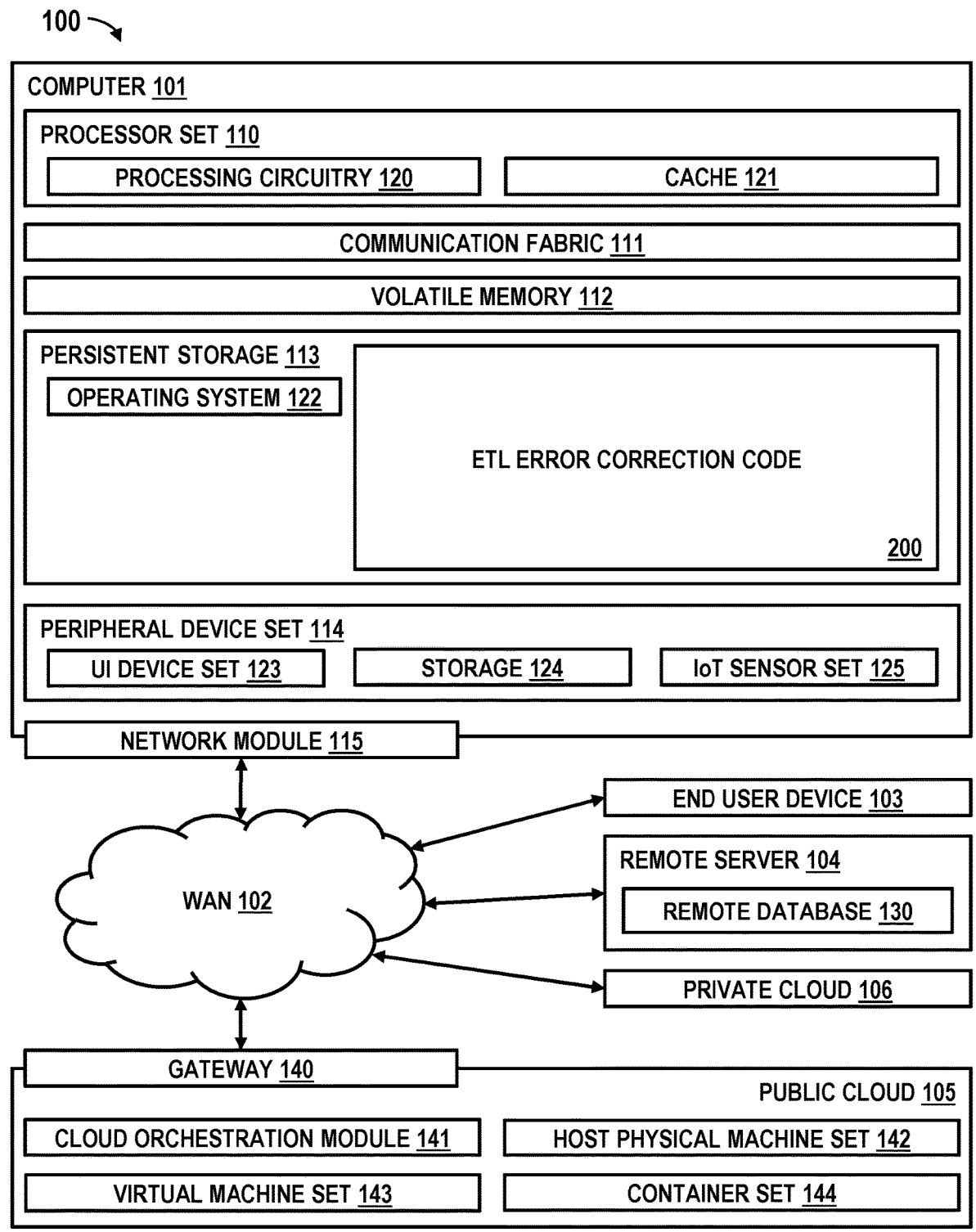
FIG. 1 depicts a computing environment according to an embodiment of the present invention.

Aspects of the present invention relate generally to data integration and, more particularly, to correcting errors of a running extract, transform, and load (ETL) processes. Implementations of the present invention are usable to correct configuration errors of an ETL process. In particular, implementations may be used to reverse an ETL process that has been configured with one of an incorrect source, an incorrect target, or an incorrect reversible transformation. Reversing the ETL process may include deleting erroneous data from the target, thereby reducing an amount of time the erroneous data is exposed. In this manner, implementations advantageously reduce the impact of human error on ETL processes.

An ETL process (which may include one or more ETL flows) may implement a data copy use case by extracting data from one customer relationship management (CRM) system and copying it to another CRM system, optionally with some enrichment from a different system. The ETL process may have been developed and tested in a test environment, after which the ETL process is to be promoted to a production system. As part of deployment in the production system, the user provides configuration information for the ETL process such as defining or selecting accounts for the source, target, or source of enrichment, and selecting objects from external systems (e.g., such as a production database versus a test database). In this situation, even though the ETL process has been tested, mistakes made by a user at this configuration stage can result in erroneous entries to the target system. For example, the user may specify an incorrect source in the configuration, which results in data being extracted from the incorrect source, transformed using the intended transformation, and loaded to the intended target. In another example, the user may specify an incorrect target in the configuration, which results in data being extracted from the intended source, transformed using the intended transformation, and loaded to the incorrect target. In another example, the user may specify an incorrect transformation in the configuration, which results in data being extracted from the intended source, transformed using the incorrect transformation, and loaded to the intended target. All of these examples result in erroneous data in a target, either as incorrect data in the correct target or as correct data in an incorrect target. A user typically realizes such a configuration mistake during or after execution of the ETL process, e.g., by observing the effect in the external system. However, a difficulty arises in attempting to correct the mistake because both the source system and the target system are not fixed and might change. A user might attempt to fix such a mistake by manually querying the target system, manually identifying records in the target system that were created by the flow, manually deleting the identified records, and running a corrected version of the ETL process. If the data were deleted from the source system prior to these steps, it would be even more difficult to recover from such a configuration mistake.

Implementations of the invention address these issues by providing a method, system, and computer program product that are configured to restore a target system to its initial state as if the erroneous ETL process had not occurred, and then update the target system with the latest data from the source system copied and enriched into the target system. Accordingly, in an aspect of the invention, there is a method, system, and computer program product for correcting business errors (also called configuration errors) made to an ETL process and for restoring the systems to the previous state, in response to a user indicating that a particular version of the ETL process is correct and previous one is incorrect. In embodiments, the method, system, and computer program product are configured to: record the source and target system details, the flow versions, and the IDs of the records created or modified in the target system; and produce a corrective ETL flow to return the target system to the desired state if a reversible change has been completed or advise the user which records need manual changes if no reversible function can be defined.

In embodiments, when a new ETL flow is deployed for an existing running ETL process, an inventive system uses a records tracking system to store a history of all records extracted based on some information, such as the source and target system information and references to the records. After storing the record history, the system analyzes the stored records against the new and old ETL flows to attempt to generate a new ETL flow containing a corrective transformation. In embodiments, the system first cancels any existing ETL flows attempting to correct the erroneous records and checks whether the transformation logic and/or load logic has been modified. If so, the system iterates over the records using the following logic: (a) if a reversible transformation has been made for a record, such as removal of fields in an attribute from the source to target systems, then generate a corrective transformation to reverse this modification; (b) if the records have been published to the wrong target system, then deploy a flow to delete the record from that target system; and (c) if neither (a) nor (b) applies, then mark the record as uncorrectable. By using implementations of this method, the same set of extracted records can be used in the corrective ETL flow without needing to re-query the source system, especially in some cases such as where records have been deleted. Similarly, if the correct target system has been used, this eliminates the workload to remove all incorrect records and publish correct values into the target system, or the work required to analyze the erroneous transformation and generate corrected values for each record. Also, by using the flow containing the corrective transformation, the volume of data transferred to resolve the erroneous entries is reduced.

Implementations do not require or utilize re-processing of messages, such as recording a series of messages and replaying those messages on demand. Systems that re-process messages have the drawback of a large demand on system resources to store complete copies of processed messages. Implementations of the invention avoid this drawback by not utilizing copies of processed messages. In this manner, implementations of the invention advantageously store less amounts of data for more advanced use cases.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as ETL error correction code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
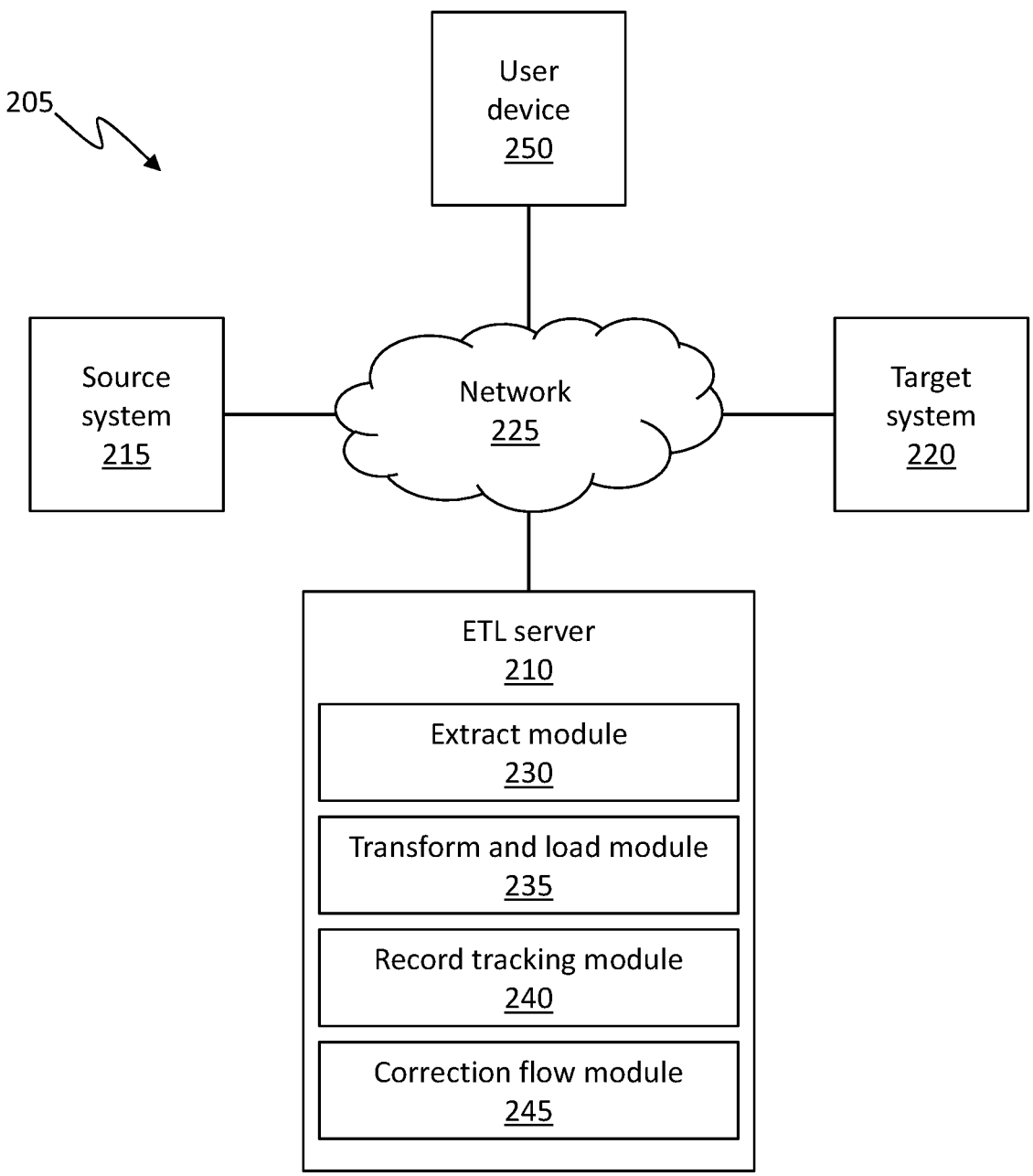
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes an ETL server 210, a source system 215, a target system 220, and a user device 250. In one example, the ETL server 210 comprises one or more instances of the computer 101 of FIG. 1. In another example, the ETL server 210 comprises one or more virtual machines or one or more containers running on one or more instances of the computer 101 of FIG. 1. Each of the source system 215 and the target system 220 may comprise one or more instances of a remote database 130 of FIG. 1, respectively. In embodiments, the ETL server 210 communicates with the source system 215 and the target system 220 via a network 225, which may comprise the WAN 102 of FIG. 1. The user device 250 may comprise one or more instances of the EUD 103 of FIG. 1, each of which may communicate with the ETL server 210 via the network 225.

In embodiments, the ETL server 210 of FIG. 2 comprises an extract module 230, a transform and load module 235, a record tracking module 240, and a correction flow module 245, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The ETL server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the extract module 230 is configured to perform one or more extraction functions of an ETL flow, such as extracting records from a source (e.g., source system 215) and sending the extracted records to a queue. The extract module 230 can extract data from a variety of data sources, which can be structured or unstructured. Those sources may include but are not limited to: Structured query language (SQL) or NoSQL servers; CRM and enterprise resource planning (ERP) systems; flat files; email; and web pages.

In embodiments, the transform and load module 235 is configured to perform one or more transformation functions and one or more load functions of an ETL flow, such as fetching the extracted records from the queue, transforming the fetched records, and loading the transformed records into a target system (e.g., target system 220). Transformation functions can include but are not limited to: filtering, cleansing, de-duplicating, validating, and authenticating the data; performing calculations, translations, or summarizations based on the raw data (which can include changing row and column headers for consistency, converting currencies or other units of measurement, editing text strings, and more); conducting audits to ensure data quality and compliance; removing, encrypting, or protecting data governed by industry or governmental regulators; and formatting the data into tables or joined tables to match the schema of the target data warehouse. Load functions can include but are not limited to moving the transformed records from the queue into a target system (e.g., target system 220).

Still referring to FIG. 2, in accordance with aspects of the invention, the record tracking module 240 is configured to track and store record history information about records extracted by an ETL flow. In embodiments, when an ETL flow is run as part of an ETL process, the record tracking module 240 stores record history information of extracted records of the ETL flow, the record history information comprising the following information: a reference to the connection detail of the source system (e.g., source system 215) from which records are extracted by the ETL flow; references to the processed records of the ETL flow, including identifiers of records created in the target system (e.g., target system 220) by the ETL flow and reference that link to the transform and load logic used by the ETL flow used to create the records; and a reference to the connection detail of the target system (e.g., target system) used by the ETL flow. The reference to the connection detail of the source system may comprise an identifier of the source system. The reference to the connection detail of the target system may comprise an identifier of the target system. The identifiers of records created in the target system may comprise record identifiers (e.g., record IDs) of changed records in the target system. The reference to the connection detail of the target system used by the ETL flow may comprise an identifier of a version of the ETL flow, which may include an identifier of (e.g., data that defines) the transformation used in the ETL flow. In this manner, the record tracking module 240 is configured to obtain record information about a plurality of records extracted by the first flow, the record information including: an identifier of a source system from which the plurality of records are extracted; an identifier of a target system; identifiers of changed records in the target system; and an identifier of a transformation used to create the changed records from the plurality of records.

With continued reference to FIG. 2, in accordance with aspects of the invention, the correction flow module 245 is configured to determine whether a change made by a deployed ETL flow is reversible. A deployed ETL flow comprises an ETL flow that has been placed into production and run as part of an ETL process, thereby resulting in changes having been made to one or more data records in a target system (e.g., target system 220). An ETL process may comprise a data integration process that includes one or more ETL flows, where each ETL flow may include one or more application steps. As used herein, an application step is a logical action step that runs a set of program code to perform a particular user-defined function or task in a data integration flow. In embodiments, in response to determining a change made by the deployed ETL flow is reversible, the correction flow module 245 is configured to generate a corrective ETL flow that is configured to reverse the change made by the deployed ETL flow. In embodiments, in response to determining a change made by the deployed ETL flow is not reversible, the correction flow module 245 is configured to generate a corrective ETL flow that is configured to notify a user (e.g., via user device 250) that the change made by the deployed ETL flow is not reversible.

In embodiments, the correction flow module 245 initiates in response to receiving user input that a deployed ETL flow has generated incorrect results. In one example, the ETL server 210 receives input from a user (e.g., via user device 250), the input indicating that a first ETL flow (e.g., the deployed ETL flow) is incorrect and that a second ETL flow is correct. The second ETL flow may be an ETL flow identified by the user in the user input to the ETL server 210. In response to this input, the correction flow module 245 determines whether a change made by the first ETL flow can be reversed. In embodiments, the correction flow module 245 makes this determination by analyzing the record history information obtained by the record tracking module 240, the first ETL flow, and the second ETL flow. In one example, the correction flow module 245 makes this determination by comparing: the respective source systems of the first ETL flow and the second ETL flow; the respective target systems of the first ETL flow and the second ETL flow; and the respective transformation functions of the first ETL flow and the second ETL flow.

In one example, the correction flow module 245 determines a change made by the first ETL flow is reversible by: determining the first ETL flow and the second ETL flow have different source systems; determining the first ETL flow and the second ETL flow have a same target system; and determining the first ETL flow and the second ETL flow have a same transformation function. In this example, the first ETL flow may have been configured incorrectly to extract records from an incorrect source system, which is different than the source system defined in the second ETL flow. In this example, the correction flow module 245 generates a corrective flow that deletes records from the target system that were changed by the first ETL flow. The correction flow module 245 may use the record history information obtained from the first ETL flow to generate the corrective ETL flow. For example, the correction flow module 245 may use the identifier of the target system and the record IDs of the changed records in the target system to generate a corrective ETL flow that deletes these changed records from the identified target system.

In another example, the correction flow module 245 determines a change made by the first ETL flow is reversible by: determining the first ETL flow and the second ETL flow have a same source system; determining the first ETL flow has a first target system and the second ETL flow has a second target system different than the first target system; and determining the first ETL flow and the second ETL flow have a same transformation function. In this example, the first ETL flow may have been configured correctly to extract records from a correct source system but configured incorrectly to load the transformed records into an incorrect target system, which is different than the target system defined in the second ETL flow. In this example, the correction flow module 245 generates a corrective flow that deletes records from the target system that were changed by the first ETL flow. The correction flow module 245 may use the record history information obtained from the first ETL flow to generate the corrective ETL flow. For example, the correction flow module 245 may use the identifier of the target system and the record IDs of the changed records in the target system to generate a corrective ETL flow that deletes these changed records from the identified target system.

In another example, the correction flow module 245 determines a change made by the first ETL flow is reversible by: determining the first ETL flow and the second ETL flow have a same source system; determining the first ETL flow and the second ETL flow have a same target system; determining the first ETL flow has a first transformation function and the second ETL flow have a second transformation function different than the first transformation function; and determining the first transformation function is reversible. In this example, the first ETL flow may have been configured correctly to extract records from a correct source system and to load the transformed records into a correct target system; however, the first ETL flow may have been configured incorrectly to apply an incorrect transformation function to the extracted records, which is different than a transformation function defined in the second ETL flow. In embodiments, the correction flow module 245 may determine the first transformation function is reversible by comparing the first transformation function to a list of known reversible functions or by analyzing the data in the changed records in the target system for indicators of irreversibility. An example of an indicator of irreversibility is that a portion of the data in the changed record in the target system has been deleted. Other indicators of irreversibility may also be used. In this example, if the first transformation function of the first ETL flow is included in the list of known reversible functions, or if there are no indicators of irreversibility, then the correction flow module 245 determines the change made by the first ETL flow is reversible and the correction flow module 245 generates a corrective flow that includes a corrective transformation function that reverses the changes made by the first ETL flow to records in the target system.

In another example, the correction flow module 245 determines a change made by the first ETL flow is not reversible by: determining the first ETL flow and the second ETL flow have a same source system; determining the first ETL flow and the second ETL flow have a same target system; determining the first ETL flow has a first transformation function and the second ETL flow have a second transformation function different than the first transformation function; and determining the first transformation function is not reversible. In this example, the first ETL flow may have been configured correctly to extract records from a correct source system and to load the transformed records into a correct target system; however, the first ETL flow may have been configured incorrectly to apply an incorrect transformation function to the extracted records, which is different than a transformation function defined in the second ETL flow. In embodiments, the correction flow module 245 may determine the first transformation function is not reversible by comparing the first transformation function to a list of known reversible functions or by analyzing the data in the changed records in the target system for indicators of irreversibility. In this example, if the first transformation function of the first ETL flow is not included in the list of known reversible functions, and if there are one or more indicators of irreversibility, then the correction flow module 245 determines the change made by the first ETL flow is not reversible and the correction flow module 245 generates a notification to the user (e.g., via the user device 250) that the first ETL flow is not reversible.

Figure 3:
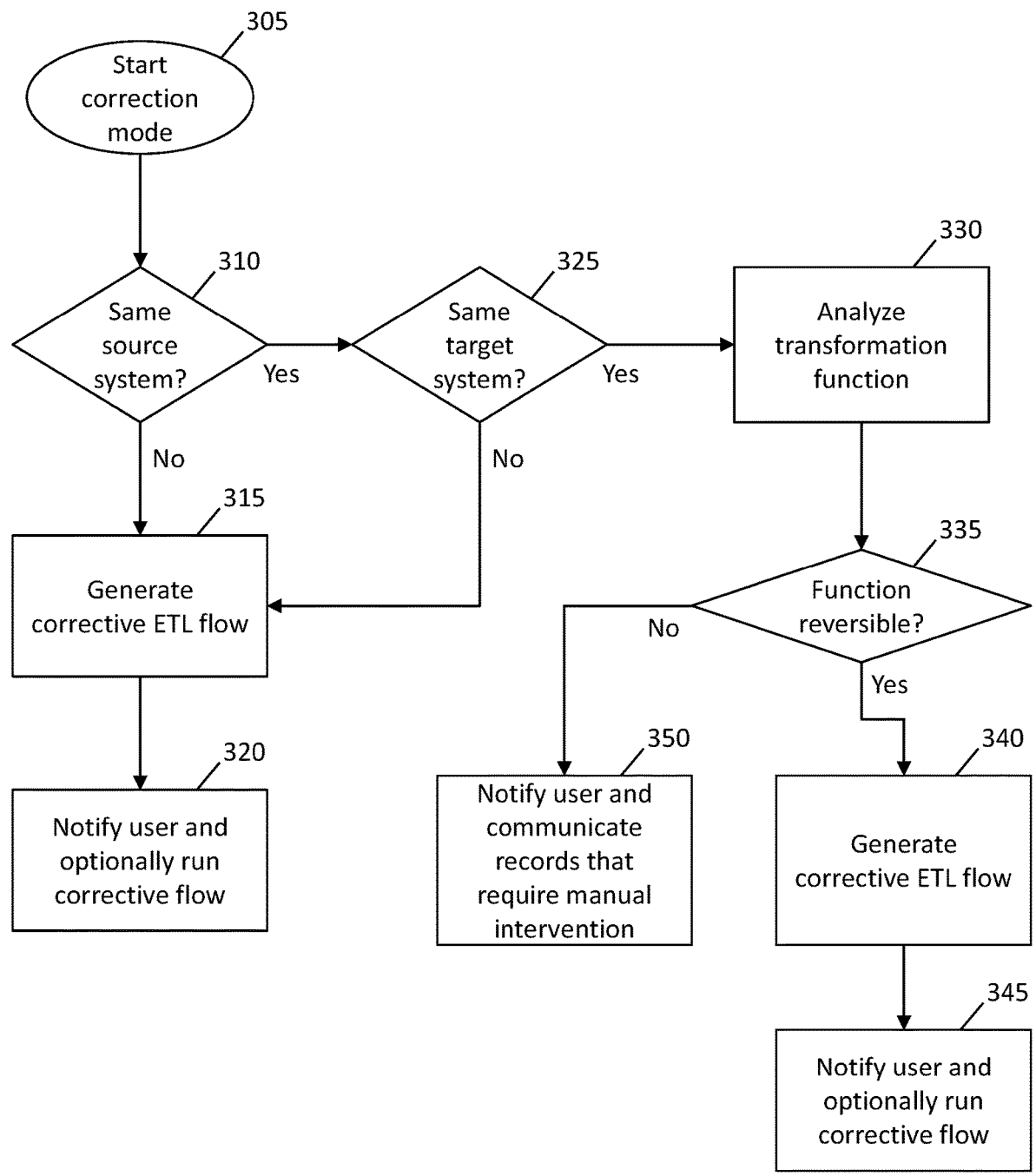
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At block 305, the system starts operating in correction mode. In embodiments, and as described with respect to FIG. 2, a user provides input via the user device 250 that a first ETL flow is incorrect, e.g., generating incorrect results. In embodiments, the user input indicates a second ETL flow that is correct.

At block 310, the system determines whether the source system for the first ETL flow is the same as the source system for the second ETL flow. In embodiments, and as described with respect to FIG. 2, the correction flow module 245 uses the record history information obtained from running the first ETL flow to compare the source systems of the first ETL flow and the second ETL flow.

If the source systems are not the same at block 310, then at block 315 the system generates a corrective ETL flow that is configured to delete records in the target system that were changed by the first ETL flow. In embodiments, and as described with respect to FIG. 2, the correction flow module 245 may use the record history information obtained from the first ETL flow to generate the corrective ETL flow. For example, the correction flow module 245 may use the identifier of the target system and the record IDs of the changed records in the target system to generate a corrective ETL flow that deletes these changed records from the identified target system.

At block 320, the system notifies the user that the changes made by the first ETL are fixable and provides the user with the option to run the corrective ETL flow. In embodiments, the ETL server 210 provides this information to the user via the user device 250. Optionally, in response to receiving user input to run the corrective ETL flow, the ETL server 210 runs the corrective ETL flow to delete the changed records from the target system. Optionally, in response to receiving user input to run the second ETL flow, the ETL server 210 runs the second ETL flow, after running the corrective ETL flow, to change records in the target system.

Still referring to FIG. 3, at block 325, the system determines whether the target system for the first ETL flow is the same as the target system for the second ETL flow. In embodiments, and as described with respect to FIG. 2, the correction flow module 245 uses the record history information obtained from running the first ETL flow to compare the target systems of the first ETL flow and the second ETL flow.

If the target systems are not the same at block 325, then the process proceeds to block 315 as described above. If the target systems are the same at block 325, then the process proceeds to block 330 where the system analyzes the first transformation function of the first ETL flow and the second transformation function of the second ETL flow. In embodiments, the ETL server 210 analyzes the source to target mapping functions of the first ETL flow and the second ETL flow.

At step 335, the system determines whether the transformation function of the first ETL flow is reversible. In embodiments, and as described with respect to FIG. 2, the correction flow module 245 determines the first transformation function is reversible by comparing the first transformation function to a list of known reversible functions or by analyzing the data in the changed records in the target system for indicators of irreversibility.

If the transformation function is reversible at block 335, then at block 340 the system generates a corrective ETL flow that is configured to reverse changes made by the first ETL flow to records in the target system. In embodiments, the corrective ETL flow may apply a corrective mathematical transformation to the data in the changed records, where the corrective mathematical transformation reverses a mathematical transformation that was made to these records by the first ETL flow.

At block 345, the system notifies the user that the changes made by the first ETL are fixable and provides the user with the option to run the corrective ETL flow. In embodiments, the ETL server 210 provides this information to the user via the user device 250. Optionally, in response to receiving user input to run the corrective ETL flow, the ETL server 210 runs the corrective ETL flow to reverse the changes made to the changed records in the target system and apply the correct changes to these records based on the second transformation function in the second ETL flow.

If the transformation function is not reversible at block 335, then at block 350 the system notifies the user (e.g., via the user device 250) that the changes made by the first ETL are not fixable. In embodiments, the ETL server 210 also communicates to the user (e.g., via the user device 250) the record IDs of the changed records in the target system so that the user can initiate some other form of remediation.

In an example use case, there is an ETL flow (e.g., a batch process) that copies customer information from one CRM system to another with a transformation including modifying a budget field. In this example, the ETL flow retrieves customer names, contacts, and budget from CRM system A (i.e., the source system) and determines whether the budget of each extracted records is below £100. In this example, the transformation is defined such that if the budget for an extracted record is less than £100, then the budget is increased with an additional allowance as a one-time promotion. In this example, the ETL flow stores (e.g., loads) the customer information in CRM system B (i.e., the target system) with the modified budget and a flag to indicate promotion has been made to that customer. In this example, CRM system B will be used by other business logic once it is ready and handed over to another team.

In this exemplary use case, the intended transformation function is to double the budget amount in an extracted record for which the budget is less than £100. However, due to a configuration error, the ETL flow has been configured with a transformation function that adds £1000 to the budget amount in an extracted record for which the budget is less than £100. In this example, a user notices the mistake in the budget data of CRM system B after the ETL flow has been run. Because the budget stored in each record in CRM system A can change over time, running a new flow against the latest data from CRM system A can cause different results and is likely to generate a different state in CRM system B. In this example, the correction flow module 245 generates a corrective flow that retrieves the changed records from CRM system B, reduces the budget of each changed record by £1000, doubles the amount of the budget of the changed record after the reduction, and loads the changed record back into CRM system B. In this manner, the system reverses the change made by the ETL flow.

Figure 4:
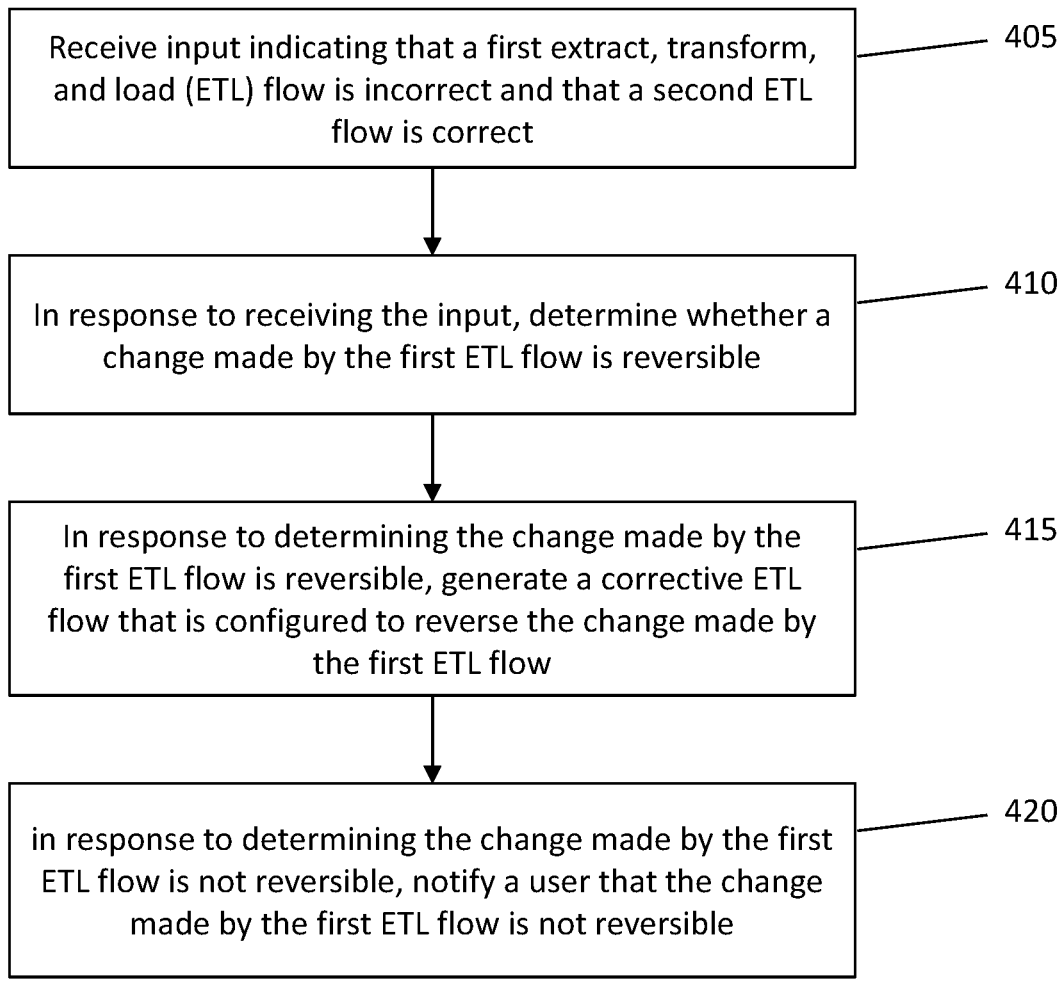
FIG. 4 shows a flowchart of an exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

At block 405, the system receives, from a user device of a user, input indicating that a first extract, transform, and load (ETL) flow is incorrect and that a second ETL flow is correct. The system may comprise the ETL server 210, and the user device may comprise the user device 250 of FIG. 2. At block 410, in response to receiving the input, the system determines whether a change made by the first ETL flow is reversible. At block 415, in response to determining the change made by the first ETL flow is reversible, the system generates a corrective ETL flow that is configured to reverse the change made by the first ETL flow. At block 420, in response to determining the change made by the first ETL flow is not reversible, the system notifies a user that the change made by the first ETL flow is not reversible. Block 420 may also include informing the user which records have been changed such that they can do a manual correction. In this manner, even in cases where the system cannot generate a corrective flow, the system provides the user with information (i.e., identifying which records were changed) that the user may utilize in a manual intervention.

The method may further comprise the system obtaining record information about a plurality of records extracted by the first flow, the record information including: an identifier of a source system from which the plurality of records are extracted; an identifier of a target system; identifiers of changed records in the target system; and an identifier of a transformation used to create the changed records from the plurality of records. The determining whether the change made by the first ETL flow is reversible may comprise comparing the record information to the second ETL flow.

The method may further comprise the system, in response to determining the change made by the first ETL flow is reversible, running the corrective ETL flow. The method may further comprise the system running the second ETL flow after running the corrective ETL flow.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a processor set and from a user device of a user, input indicating that a first extract, transform, and load (ETL) flow is incorrect and that a second ETL flow is correct;
in response to receiving the input, determining, by the processor set, whether a change made by the first ETL flow is reversible;
in response to determining the change made by the first ETL flow is reversible, generating, by the processor set, a corrective ETL flow that is configured to reverse the change made by the first ETL flow; and
in response to determining the change made by the first ETL flow is not reversible, notifying, by the processor set, a user that the change made by the first ETL flow is not reversible, and informing the user which records have been changed.

2. The computer-implemented method of claim 1, further comprising obtaining record information about a plurality of records extracted by the first flow, the record information including:
an identifier of a source system from which the plurality of records are extracted;
an identifier of a target system;
identifiers of changed records in the target system; and
an identifier of a transformation used to create the changed records from the plurality of records.

3. The computer-implemented method of claim 2, wherein the determining whether the change made by the first ETL flow is reversible comprises comparing the record information to the second ETL flow.

4. The computer-implemented method of claim 1, wherein the determining the change made by the first ETL flow is reversible comprises:
determining the first ETL flow and the second ETL flow have different source systems;
determining the first ETL flow and the second ETL flow have a same target system; and
determining the first ETL flow and the second ETL flow have a same transformation function.

5. The computer-implemented method of claim 4, wherein the corrective ETL flow deletes records from the target system that were changed by the first ETL flow.

6. The computer-implemented method of claim 1, wherein the determining the change made by the first ETL flow is reversible comprises:
determining the first ETL flow and the second ETL flow have a same source system;
determining the first ETL flow has a first target system and the second ETL flow has a second target system different than the first target system; and
determining the first ETL flow and the second ETL flow have a same transformation function.

7. The computer-implemented method of claim 6, wherein the corrective ETL flow deletes records from the first target system that were changed by the first ETL flow.

8. The computer-implemented method of claim 1, wherein the determining the change made by the first ETL flow is reversible comprises:
determining the first ETL flow and the second ETL flow have a same source system;
determining the first ETL flow and the second ETL flow have a same target system;
determining the first ETL flow has a first transformation function and the second ETL flow have a second transformation function different than the first transformation function; and
determining the first transformation function is reversible.

9. The computer-implemented method of claim 8, wherein the corrective ETL flow modifies records in the target system that were changed by the first transformation function.

10. The computer-implemented method of claim 9, wherein the modifying the records in the target system comprises reversing a change to the records in the target system caused by the first transformation function.

11. The computer-implemented method of claim 1, wherein the determining the change made by the first ETL flow is not reversible comprises:
determining the first ETL flow and the second ETL flow have a same source system;
determining the first ETL flow and the second ETL flow have a same target system;
determining the first ETL flow has a first transformation function and the second ETL flow have a second transformation function different than the first transformation function; and
determining the first transformation function is not reversible.

12. The computer-implemented method of claim 1, further comprising, in response to determining the change made by the first ETL flow is reversible, running the corrective ETL flow.

13. The computer-implemented method of claim 12, further comprising running the second ETL flow after running the corrective ETL flow.

14. A computer program product comprising one or more computer readable storage media having program instructions collectively stored on the one or more computer readable storage media, the program instructions executable to:
receive, from a user device of a user, input indicating that a first extract, transform, and load (ETL) flow is incorrect and that a second ETL flow is correct;
in response to receiving the input, determine whether a change made by the first ETL flow is reversible;
in response to determining the change made by the first ETL flow is reversible, generate a corrective ETL flow that is configured to reverse the change made by the first ETL flow; and in response to determining the change made by the first ETL flow is not reversible, notify a user that the change made by the first ETL flow is not reversible, and informing the user which records have been changed.

15. The computer program product of claim 14, wherein the program instructions are executable to obtain record information about a plurality of records extracted by the first flow, the record information including:
an identifier of a source system from which the plurality of records are extracted;
an identifier of a target system;
identifiers of changed records in the target system; and
an identifier of a transformation used to create the changed records from the plurality of records.

16. The computer program product of claim 15, wherein the determining whether the change made by the first ETL flow is reversible comprises comparing the record information to the second ETL flow.

17. The computer program product of claim 14, wherein the program instructions are executable to run the corrective ETL flow.

18. A system comprising:
a processor set, one or more computer readable storage media, and program instructions collectively stored on the one or more computer readable storage media, the program instructions executable to:
receive, from a user device of a user, input indicating that a first extract, transform, and load (ETL) flow is incorrect and that a second ETL flow is correct;
in response to receiving the input, determine whether a change made by the first ETL flow is reversible;
in response to determining the change made by the first ETL flow is reversible, generate a corrective ETL flow that is configured to reverse the change made by the first ETL flow; and
in response to determining the change made by the first ETL flow is not reversible, notify a user that the change made by the first ETL flow is not reversible, and informing the user which records have been changed.

19. The system of claim 18, wherein:
the program instructions are executable to obtain record information about a plurality of records extracted by the first flow;
the record information includes: an identifier of a source system from which the plurality of records are extracted; an identifier of a target system; identifiers of changed records in the target system; and an identifier of a transformation used to create the changed records from the plurality of records; and
the determining whether the change made by the first ETL flow is reversible comprises comparing the record information to the second ETL flow.

20. The system of claim 18, wherein the program instructions are executable to run the corrective ETL flow.

* * * * *